United States Patent [19]

Pekar et al.

[11] Patent Number: 5,680,195
[45] Date of Patent: Oct. 21, 1997

[54] VISION ENHANCING ASSEMBLY

[75] Inventors: Jaroslaw Pekar, Chapel Hills; Henry A. Greene, Durham, both of N.C.

[73] Assignee: Ocutech, Inc., Chapel Hill, N.C.

[21] Appl. No.: 538,592

[22] Filed: Oct. 3, 1995

[51] Int. Cl.$^6$ .............. G02C 1/00; G02B 23/00; G02B 27/02
[52] U.S. Cl. .............. 351/158; 359/407; 359/482
[58] Field of Search .............. 351/41, 158, 57; 359/407, 480, 481, 482, 382

[56] References Cited

U.S. PATENT DOCUMENTS

| | | | |
|---|---|---|---|
| 1,610,553 | 12/1926 | Jones | 351/158 |
| 2,710,560 | 6/1955 | Thompson | 351/158 |
| 3,273,456 | 9/1966 | Feinbloom | 351/158 |
| 4,429,959 | 2/1984 | Walters | 351/158 |
| 4,704,000 | 11/1987 | Pekar | 351/41 X |
| 4,767,203 | 8/1988 | Zahir | 351/158 |
| 4,795,235 | 1/1989 | Spitzberg | 351/158 X |
| 5,028,127 | 7/1991 | Spitzberg | 351/158 |
| 5,291,229 | 3/1994 | Feinbloom | 351/158 |
| 5,384,607 | 1/1995 | Morris et al. | 351/158 |

FOREIGN PATENT DOCUMENTS 307 763  10/1917  Germany.

*Primary Examiner*—Huy Mai
*Attorney, Agent, or Firm*—Nixon & Vanderhye P.C.

[57] ABSTRACT

A small, light, wide field (e.g. about a 15 degree field of view), Keplerian bioptic telescope is provided which preferably is mounted in association with conventional eyeglasses. A casing includes first and second open ends, a middle section, and an optical system mounted within it. The optical system includes an eye lens adjacent the casing first end, an objective lens adjacent the casing second end, and a right angle prism and penta prism between the eye lens and objective lens, disposed side by side, typically with faces in face to face engagement. A field lens may be provided between the eye lens and the prisms. The position of the objective lens is adjustable by movement toward and away from the casing middle section. An opening may be formed in a first eyeglass lens and the casing press fit into the opening so that the first end of the casing is on a first side of the eyeglass lens and the middle section is on the second side of the eyeglass lens opposite the first side, extending about 1.25 inches or less from the lens.

20 Claims, 4 Drawing Sheets

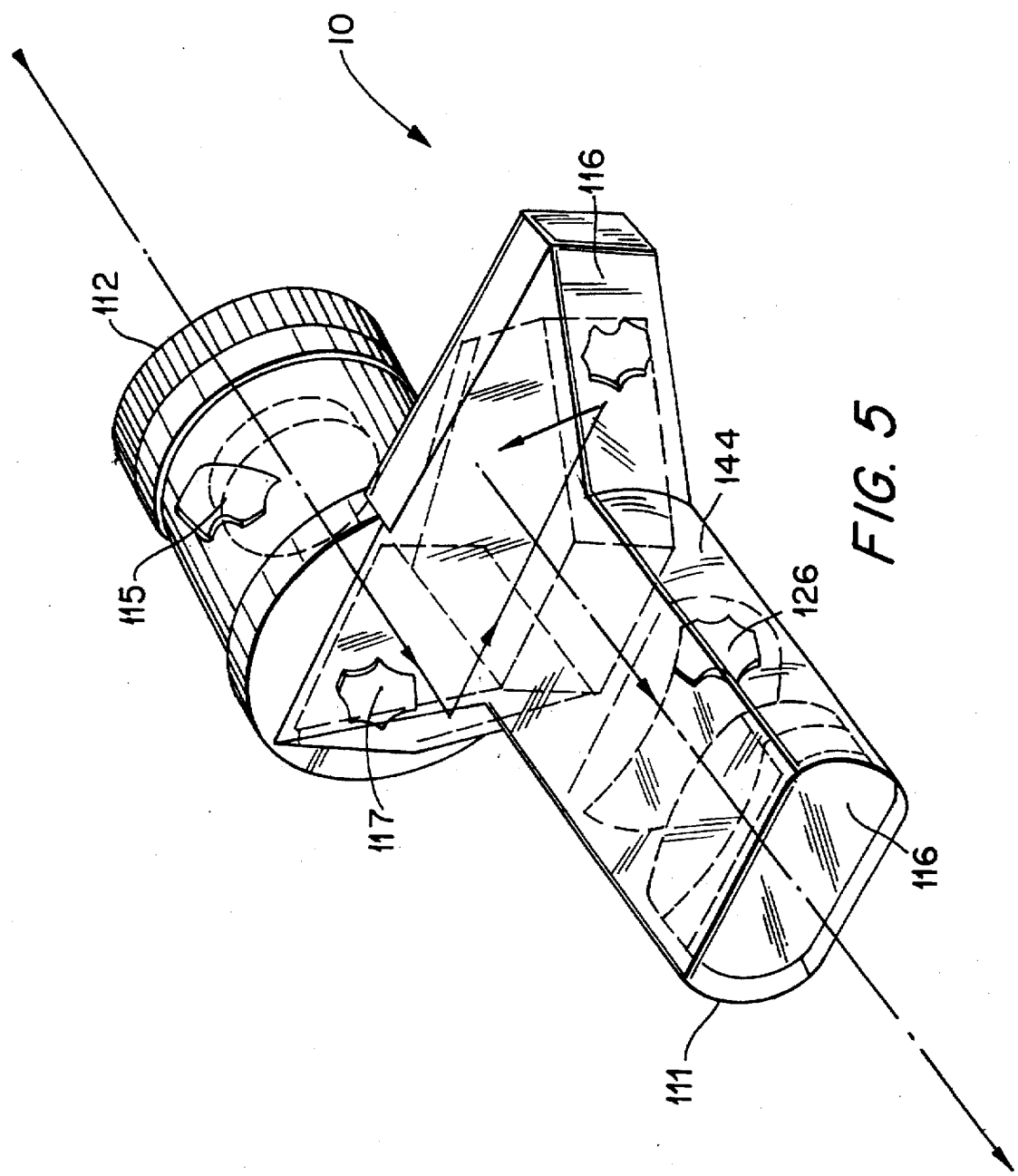

VISION ENHANCING ASSEMBLY

BACKGROUND AND SUMMARY OF THE INVENTION

The invention relates to a vision enhancing assembly, particularly designed to be mounted on a pair of conventional eyeglasses, and utilizable either by low vision people, or for uses where enhanced vision is necessary, such as surgery, fine piece work, etc.

In U.S. Pat. No. 4,704,000 (the disclosure of which is hereby incorporated by reference herein) a vision enhancing system is illustrated that is particularly suitable for use by low vision people and which would mount on eyeglasses in an unobtrusive manner. While the vision enhancing system illustrated therein is a very effective system, there are circumstances where it is desirable to maximize the horizontal field viewed by the person wearing the vision enhancing system. This has been accomplished according to the present invention (although with the sacrifice of some aesthetics) by utilizing particular optical elements, which are typically mounted on a pair of conventional eyeglasses. The optical elements chosen according to the present invention for maximizing the horizontal field include a penta ("roof") prism and a right angle prism which can be of any desired vertical height while maintaining a constant horizontal dimension, these prisms mounted side-by-side, and typically face to face, in association with other optical elements so that a maximum horizontal field for this particular use is obtained.

According to the invention it is possible to provide the smallest, lightest, widest field Keplerian bioptic telescope ever commercialized, with focusing capability from infinity to twelve inches, and internal refractive corrections from +12 to −12. Typically a 3×expanded field, with a 15.0 degree field of view, can be obtained.

According to one aspect of the present invention a vision enhancing assembly for mounting on eyeglasses is provided comprising the following components: A substantially opaque casing including an open first end, an open second end, and a middle section. An optical system mounted within the casing, including an eye lens (ocular) adjacent the first end, an objective lens adjacent the second end, and a right angle prism and penta prism between the eye lens and objective lens, the right angle and penta prisms disposed side-by-side. And means for mounting the casing to eyeglasses so that the eye lens is adjacent an eyeglass lens and so that at least the middle section of the casing extends outwardly away from the eyeglass lens.

A field lens is typically provided between the eye lens and the prisms. Means are preferably provided for adjusting the position of the objective lens with respect to the eye lens by movement toward and away from the middle section of the casing, such adjustment means being screw threaded elements, conventional "telescoping" elements with a fit that allows the elements to be maintained in the position to which they have been moved, or other conventional systems.

The casing middle section may have a shape generally like that of a truncated substantially quadrate based pyramid with substantially quadrate side walls. The right angle prism typically has first and second legs and a hypotenuse, and the penta prism includes a side face through which a light path through the casing passes. The first leg of the right angle prism and the side face of the penta prism are typically mounted in substantially face-to-face engagement with each other in the casing middle section, providing maximum horizontal field, e.g. of about 15 degrees.

The means for mounting the casing to the eyeglasses may comprise conventional mounting mechanisms may be utilized, such as the elevating plates such as shown in U.S. Pat. No. 4,429,959, or plates or a bar which pivot in front of the eyeglasses when in use, or which are attached to the eyeglasses as seen in U.S. Pat. No. 5,384,607, etc. An opening may be formed in a first eyeglass lens and the casing press fit into the opening so that the first end of the casing is on a first side of the eyeglass lens and the middle section is on the second side of the eyeglass lens opposite the first side, the casing extending about 1.25 inches or less outwardly from the eyeglass lens.

According to another aspect of the present invention a vision enhancing assembly is provided comprising the following components: A substantially opaque casing including an open first end, an open second end, and a middle section. An optical system mounted within the casing, including an eye lens adjacent the first end, an objective lens adjacent the second end, and a right angle prism and a penta prism between the eye lens and objective lens, the right angle and penta prisms disposed side-by-side. And, means for adjusting the position of the objective lens with respect to the eye lens, by movement of said objective lens toward and away from the middle section of the casing.

The right angle prism is typically between the objective lens and the penta prism. The details of the vision enhancing system preferably are as described above.

According to yet another aspect of the present invention (the details of which will also be substantially as described above) a vision enhancing assembly with a wide horizontal field is provided comprising the following components: A casing including a first end, a second end, and a middle section. An optical system mounted within the casing, including an eye lens adjacent the first end, an objective lens adjacent the second end, and other optical elements therebetween. And means for mounting the casing to the eyeglasses, the mounting means comprising an opening in the first eyeglass lens and the casing press fit into the opening in the eyeglass lens so that the first end thereof is on a first side of the eyeglass lens, and the middle section is on the second side of said eyeglass lens, opposite the first side.

It is the primary object of the present invention to provide a desirable vision enhancing assembly with a wide horizontal field, and/or readily mountable on conventional eyeglasses. This and other objects of the invention will become clear from an inspection of the detailed description of the invention and from the appended claims.

BRIEF DESCRIPTION OF THE DRAWINGS

FIG. 5 is a top perspective schematic view of a modification of the assembly according to the invention.

DETAILED DESCRIPTION OF THE DRAWINGS

Figure 1:
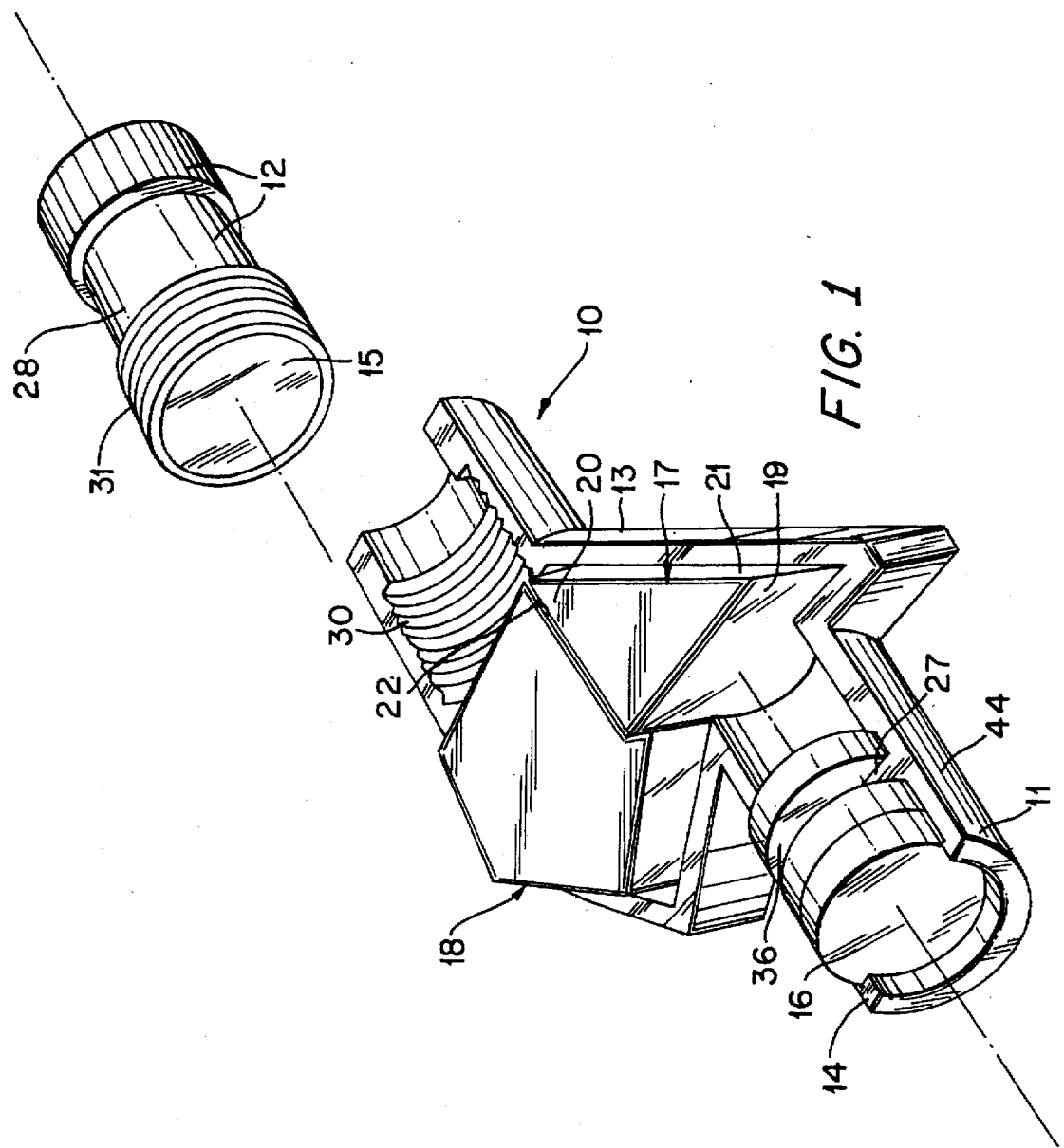
FIG. 1 is a top perspective partially exploded schematic view of an exemplary vision enhancing assembly according to the present invention adapted to be affixed to a pair of eyeglasses with portions of the casing cut away for clarity of illustration, and shown larger than the actual size.
Figure 2:
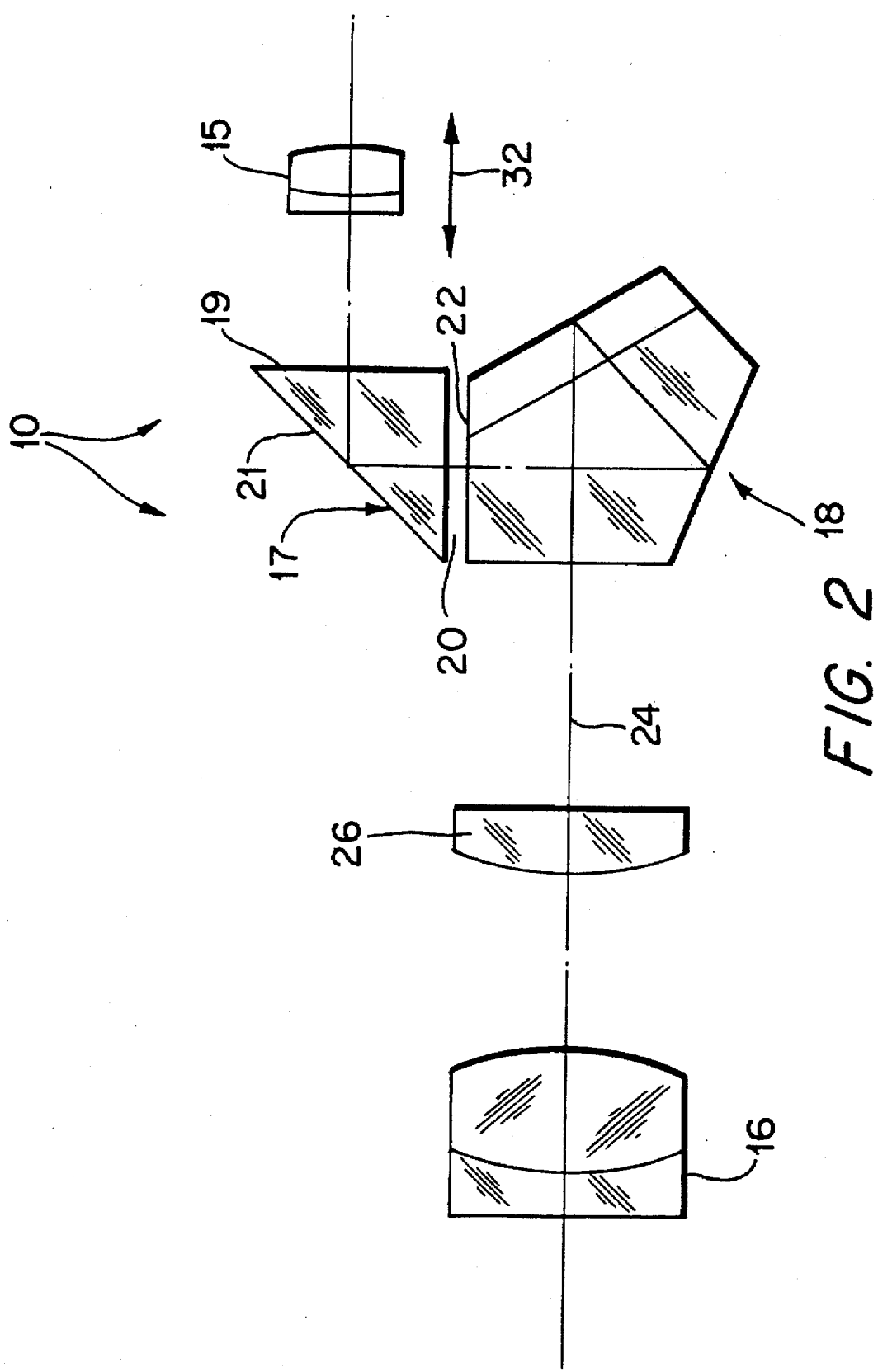
FIG. 2 is a top exploded view of a slightly modified form of the optical components of the assembly of FIG. 1.

An exemplary vision enhancing assembly, preferably for mounting to eyeglasses, is shown generally by reference numeral 10 in FIG. 1, and the optical components only thereof are shown by reference numeral 10' in FIG. 2. The assembly includes a substantially opaque casing (e.g. of relatively rigid plastic) having a first open end 11, a second open end 12, and a middle section 13 between the ends 11, 12. The optical system 10' includes an eye lens (ocular) 16 (e.g. having a focal length of about 12 millimeters)—e.g. mounted in a substantially circular groove 14 adjacent the first end 11 of the casing—and an objective lens 15 (e.g. a three power objective lens with a focal length of about 9 millimeters) mounted adjacent the second end 12, e.g. press fit in a casing portion including the second end 12 as seen in FIG. 1. Mounted within the middle section 13 of the casing is a right angle prism 17 and a roof or penta prism 18. The right angle prism 17 includes side faces 19, 20 forming the legs of a triangle, as well as another face 21 forming the hypoteneuse, and the penta prism 18 includes a number of side faces including the side face 22 thereof through which a light path passes. Preferably the roof and penta prisms 17, 18 are disposed side by side in the casing middle section 13, as illustrated in FIG. 1 and as schematically shown in FIG. 2, the light path—shown in dotted line at 24 in FIGS. 1 and 2—extending through the face 22 of the penta prism 18. Preferably the faces 20, 22 are in substantially face to face engagement. Also, preferably the right angle prism 17 is between the eye lens 16 and the penta prism 18 (in the light path 24), as seen in FIG. 1, although the penta prism 18 and right angle prism 17 can be reversed as seen in FIG. 2.

Typically a field lens 26 (e.g. having approximately a 12 millimeter focal length) is provided between the eye lens 16 and the prisms 17, 18, e.g. mounted near the eye lens 16 in a groove 27 adjacent the first end 11 of the casing.

The casing including the portions 11 and 13 may be formed in two halves for the majority thereof, as seen in the left side of FIG. 1, while the objective lens block 28 containing the second end 12 and the objective lens 15 is in one piece. After all of the components are provided in the casing the other half is moved into place and adhesively secured, ultrasonically welded, clamped, or otherwise held in place to the half illustrated in FIG. 2. Various spacers of resilient material may be provided where desired in the casing to positively locate the optical elements in place.

Means are also preferably provided for adjusting the position of the objective lens 15 with respect to the eye lens 16. Such means may comprise a wide variety of conventional structures, such as conventional "telescoping" elements with a fit that allows a movable element (e.g. 28) to be maintained in the position to which it has been moved, or other conventional systems, or the screw threaded system illustrated in FIG. 1. For example, the middle section 13 of the casing portion adjacent the objective lens block 28 has internal screw threads 30 formed therein, while the objective lens block 28 has external screw threads 31 formed thereon which cooperate with the threads 30 and allow adjustment of the spacing between the objective 15 and the penta prism 18 (and thus the eye piece 16 since the eye piece 13 remains stationary) by rotation of the lens block 28, e.g. by grasping and rotating one second end 12. The arrows 32 in FIG. 2 illustrate this adjustment.

The particular optical system 10' as described above is advantageous in providing a maximized horizontal field. Utilizing the optical system 10' it is possible to have about a 15 degree field of view, which is exceptionally wide especially considering the lightness and small size of the assembly 10 according to the invention, which is seen full size in FIG. 3.

Preferably the optical system 10' according to the invention may be focused from infinity to 12 inches, with internal refractive corrections from +12 to −12. Eye piece connections may also be provided if desired, as may be filter and reading caps which fit over one or both of the ends 11, 12 to completely close them off, or to provide filtering of light therethrough. While typically the optical system 10' has a 3×expanded field (of a Keplerian telescope system) other powers may be provided. Also, stop mechanisms may be utilized for the rotation of the threads 30, 31 with respect to each other to allow fast focusing (e.g. a full focus range covered in less than one complete revolution of the element 28 with respect to the casing section 13).

Figure 3:
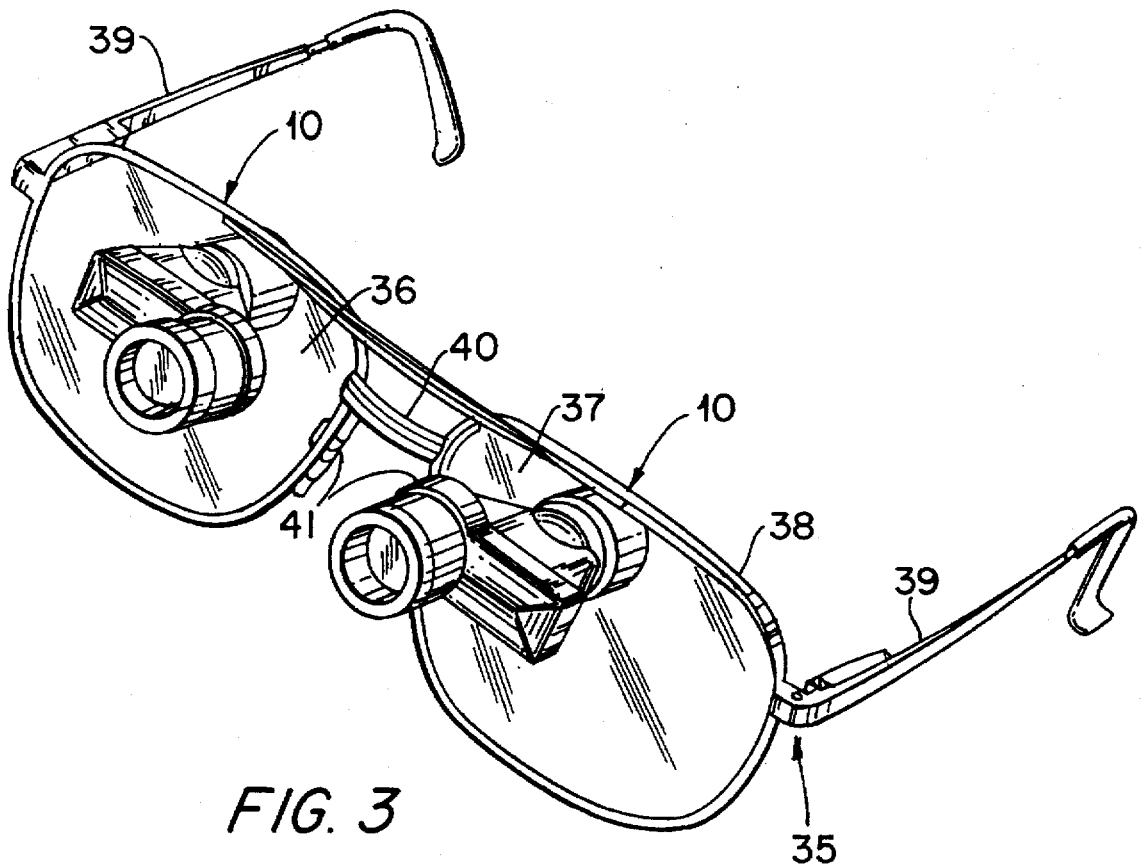
FIG. 3 is an actual size top perspective view illustrating connection of a pair of the assemblies of FIG. 1 to conventional eyeglasses.
Figure 4:
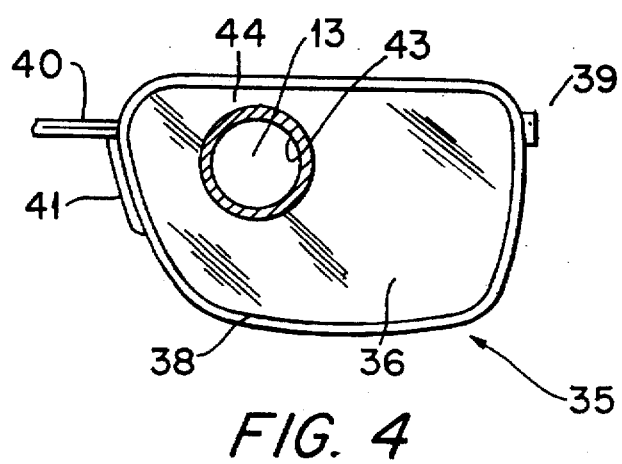
FIG. 4 is a detail longitudinal front view, partly in cross-section and partly in elevation, illustrating one exemplary manner of interconnection between an assembly of FIG. 1 and eyeglasses, as in FIG. 3.

Preferably assembly 10 according to the present invention is mounted in association with conventional eyeglasses, shown generally at 35 in FIG. 3. The eyeglasses 35 have the conventional components of first and second eyeglass lenses 36, 37, a metal or plastic frame 38, ear pieces 39 pivotally mounted to the frame 38, a cross piece 40 and nose engaging supports 41. The assemblies 10 according to the present invention may be mounted in association with the eyeglasses 35 in a wide variety of manners, such as conventional elevating plates or attachment to the eyelgasses as seen in U.S. Pat. Nos. 4,429,959 and 5,384,607. However, a preferred manner of mounting assemblies 10 is by drilling or otherwise forming an opening in a lens 36, 37—see the opening 43 in FIG. 4 for example which is preferably approximately at the position that an eyeball would be for a wearer of the glasses 35—and then inserting the casing portion 44 between the middle section 13 and the first end 11 into the opening 43. The opening 43 preferably has a diameter that is substantially the same as or only slightly larger than the diameter of the casing section 44 so that there is substantially a press or friction fit between the section 44 and the opening 43, properly holding the entire assembly 10 (especially in view of its lightweight, which is only a few ounces) in proper position.

The lenses 36, 37 may either be corrective lenses or plain glass or plastic, and are constructed so that they are thick and strong enough to properly hold an assembly 10 in place. As seen in FIG. 3, preferably an assembly 10 is provided—as described above—in each of the lens 36, 37.

When the assembly 10 is mounted within a lens 36, 37, a second end 12 thereof is typically spaced no more than about 1.25 inches from the lens 36, 37, while the first end 11 thereof is spaced significantly less than 0.5 inches (e.g. about 0.25 inches) on the opposite side of the lens 36 from the second end 12. The first end 11 will be positioned so that it does not engage the eyeball of the wearer of the glasses 35 in normal use, though it is adjacent the eyeball.

The assemblies 10, mounted in eyeglasses 35, as described above may be used for a number of different low vision people, and are best utilized with those individuals whose best corrected vision is as poor as 20/200 for disorders where accuity is responsive to magnification. Appropriate visual diagnoses include macular degeneration, Stargardt's Disease, nystagmus optic atrophy, albinism, achromatopsia, macula-holes, and the like. The assemblies 10 are particularly useful for viewing television or computer screens, seeing signs and human faces, as well as other activities. However, the invention is not limited to use by vision impaired persons, but may be used in surgery by surgeons, or in other places where high visual accuity is necessary.

FIG. 5 illustrates another exemplary embodiment of a vision enhancing assembly according to the present invention, shown generally by reference numeral 110. In the FIG. 5 embodiment all components that are the same as those in the FIG. 1 embodiment are shown by the same reference numeral only preceded a "1". In this particular embodiment the penta prism 118 and the right prism 117 have the relationships indicated by the optical system in FIG. 2, and the eye lens 116 and the field lens 126 are substantially racetrack or rectangular in shape, rather than substantially circular. While the casing middle section 113 generally simulates the shape of a truncated substantially quadrate base pyramid with substantially quadrate side walls, the middle section 113 is much closer to that precise configuration and shape.

It will thus be seen that according to the present invention a simple yet effective vision enhancing assembly, having a wide horizontal field, small, and lightweight, is provided, which may be provided in monocular, binocular, or other forms. While the invention has been herein shown and described in what is presently conceived to be the most practical preferred embodiment thereof, it will be apparent to those of ordinary skill in the art that many modifications may be made thereof within the scope of the invention, which scope is to be accorded the broadest interpretation of the appended claims so as to encompass all equivalent structures and devices.

What is claimed is:

1. A vision enhancing assembly with a wide field of vision for mounting to eyeglasses, comprising:

a substantially opaque casing including an open first end, an open second end, and a middle section;

an optical system mounted within said casing, including an eye lens adjacent said first end, an objective lens adjacent said second end, and a right angle prism and penta prism between said eye lens and objective lens, said right angle and penta prisms disposed side-by-side; and means for mounting said casing to eyeglasses so that said eye lens is adjacent an eyeglass lens and so that at least said middle section of said casing extends outwardly away from the eyeglass lens.

2. A vision enhancing system as recited in claim 1 further comprising a field lens between said eye lens and said prisms.

3. A vision enhancing system as recited in claim 1 further comprising means for adjusting the position of said objective lens with respect to said eye lens, by movement toward and away from said middle section of said casing.

4. A vision enhancing system as recited in claim 3 wherein said adjusting means comprises a screw thread connected between said second end of said casing and said middle section thereof.

5. A vision enhancing system as recited in claim 1 wherein said casing middle section has the shape of a truncated substantially quadrate base pyramid with substantially quadrate side walls.

6. A vision enhancing system as recited in claim 1 wherein said right angle prism has first and second faces and a hypotenuse, and wherein said penta prism includes a side face through which a light path through said casing passes; said first faces of said right angle prism and said side face of said penta prism mounted in substantially face-to-face engagement with each other in said casing middle section.

7. A vision enhancing system as recited in claim 1 wherein said means for mounting said casing to eyeglasses comprises an opening in a lens of said eyeglasses making a press fit with said casing adjacent said first end thereof, so that said first end is on one side of said glass lens and said middle section of the opposite side.

8. A vision enhancing system as recited in claim 7 wherein said casing and optical system comprise a first casing and optical system; and further comprising a second casing and optical system substantially identical to said first casing and optical system and mounted to a second eyeglass lens of said eyeglasses.

9. A vision enhancing system as recited in claim 1 wherein said optical system has a horizontal field of view of about 15 degrees.

10. A vision enhancing system as recited in claim 1 wherein said right angle prism is between said eye lens and said penta prism.

11. A vision enhancing assembly comprising:

a substantially opaque casing including an open first end, an open second end, and a middle section;

an optical system mounted within said casing, including an eye lens adjacent said first end, an objective lens adjacent said second end, and a right angle prism and penta prism between said eye lens and objective lens, said right angle and penta prisms disposed side-by-side; and means for adjusting the position of said objective lens with respect to said eye lens, by movement of said objective lens toward and away from said middle section of said casing.

12. A vision enhancing system as recited in claim 11 wherein said right angle prism has first and second faces and a hypotenuse, and wherein said penta prism includes a side face through which a light path through said casing passes; said first faces of said right angle prism and said side face of said penta prism mounted in substantially face-to-face engagement with each other in said casing middle section.

13. A vision enhancing system as recited in claim 12 further comprising a field lens between said eye lens and said prisms.

14. A vision enhancing system as recited in claim 13 wherein said right angle prism is between said objective lens and said penta prism.

15. A vision enhancing system as recited in claim 12 wherein said optical system has a horizontal field of view of about 15 degrees.

16. A vision enhancing assembly with a wide horizontal field, in combination with eyeglasses having a frame with first and second ear pieces and first and second eyeglass lenses, comprising:

a casing including a first end, a second end, and a middle section;

an optical system mounted within said casing, including an eye lens adjacent said first end, an objective lens adjacent said second end, and other optical elements therebetween; and means for mounting said casing to said eyeglasses, said mounting means comprising an opening in said first eyeglass lens and said casing press fit into said opening in said eyeglass lens so that said first end thereof is on a first side of said eyeglass lens, and said middle section is on the second side of said eyeglass lens, opposite said first side; and wherein said optical elements between said eye lens and objective comprise a right angle prism and penta prism between said eye lens and objective lens, said right angle and penta prisms disposed side-by-side.

17. A vision enhancing system as recited in claim 16 wherein said right angle prism has first and second faces and a hypotenuse, and wherein said penta prism includes a side face through which a light path through said casing passes; said first faces of said right angle prism and said side face of said penta prism mounted in substantially face-to-face engagement with each other in said casing middle section.

18. A vision enhancing system as recited in claim 16 wherein said casing and optical system comprise a first casing and optical system; and further comprising a second casing and optical system substantially identical to said first casing and optical system and mounted to the second eyeglass lens of said eyeglasses.

19. A vision enhancing system as recited in claim 16 wherein: said optical system is three power and has a horizontal field of view about 15 degrees wide; said second end does not extend from said first eyeglass lens more than about 1.25 inches., and said first end does not extend all the way to the eyeball of a wearer of the eyeglasses, said first end positioned at the approximate location of an eyeball of a wearer of the eyeglasses.

20. A vision enhancing system as recited in claim 16 wherein said optical system has a horizontal field of view of about 15 degrees.

* * * * *